United States Patent [19]
Palloks

[11] 4,403,376
[45] Sep. 13, 1983

[54] CENTRAL BELT LOCK, PARTICULARLY FOR AIRCRAFT SAFETY BELT

[75] Inventor: Armin Palloks, Heist, Fed. Rep. of Germany

[73] Assignee: Autoflug GmbH, Rellingen, Fed. Rep. of Germany

[21] Appl. No.: 229,130

[22] Filed: Jan. 28, 1981

[30] Foreign Application Priority Data

Dec. 18, 1980 [DE] Fed. Rep. of Germany ....... 3047664

[51] Int. Cl.³ .............................................. A44B 11/25
[52] U.S. Cl. ............................................... 24/205.17
[58] Field of Search ............ 24/203 R, 205.17, 205.18

[56] References Cited
U.S. PATENT DOCUMENTS 1,177,927  4/1916  Calthrop .......................... 24/205.17
3,633,965  1/1972  Norman et al. ............... 24/205.17 X
3,639,948  2/1972  Sherman .......................... 24/205.17

FOREIGN PATENT DOCUMENTS 116111   3/1946  Australia ......................... 24/205.17
758185  10/1956  United Kingdom ............ 24/205.17

Primary Examiner—Robert P. Swiatek
Attorney, Agent, or Firm—Becker & Becker, Inc.

[57] ABSTRACT

A central belt lock for strapping in individuals, particularly in aircraft. The belt lock serves for simultaneous releasable connection of several belts which have respective connection tongues with hook-shaped connection devices. The lock includes a lock housing having a hook-shaped bead, and a disc arranged across from the bead, and shiftable against spring action upon a hub secured to the housing, with the disc being tiltable during at least one position of a latching device, which position permits the insertion of the connection tongues. The hub has a tapering at that end thereof fastened to the housing, with the tapering extending essentially over the shifting path of the movable disc, and in that the movable disc has an opening which encircles the hub and has a diameter corresponding essentially to the diameter of the cylindrical part of the hub.

4 Claims, 3 Drawing Figures

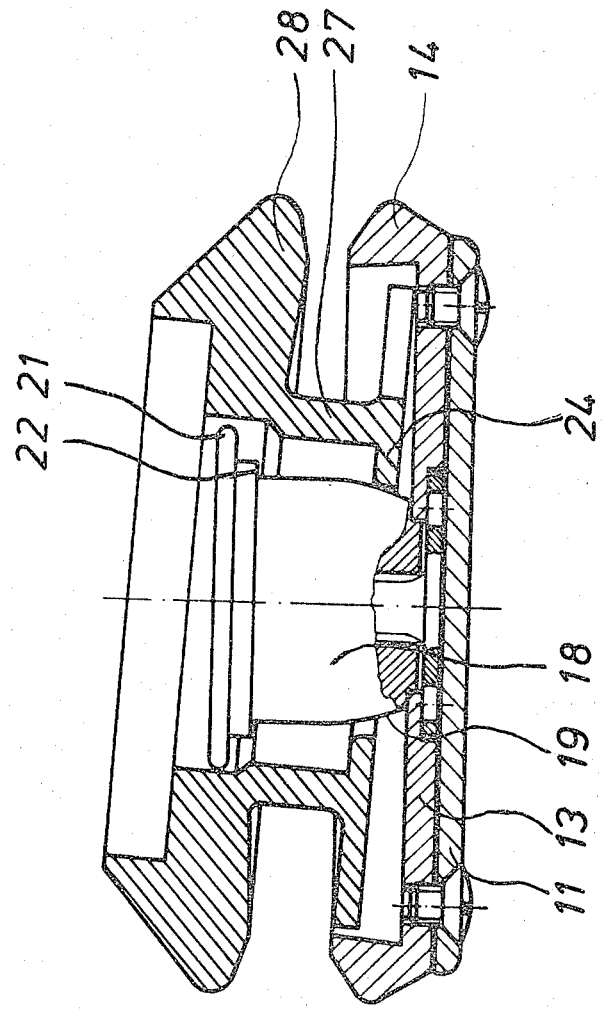

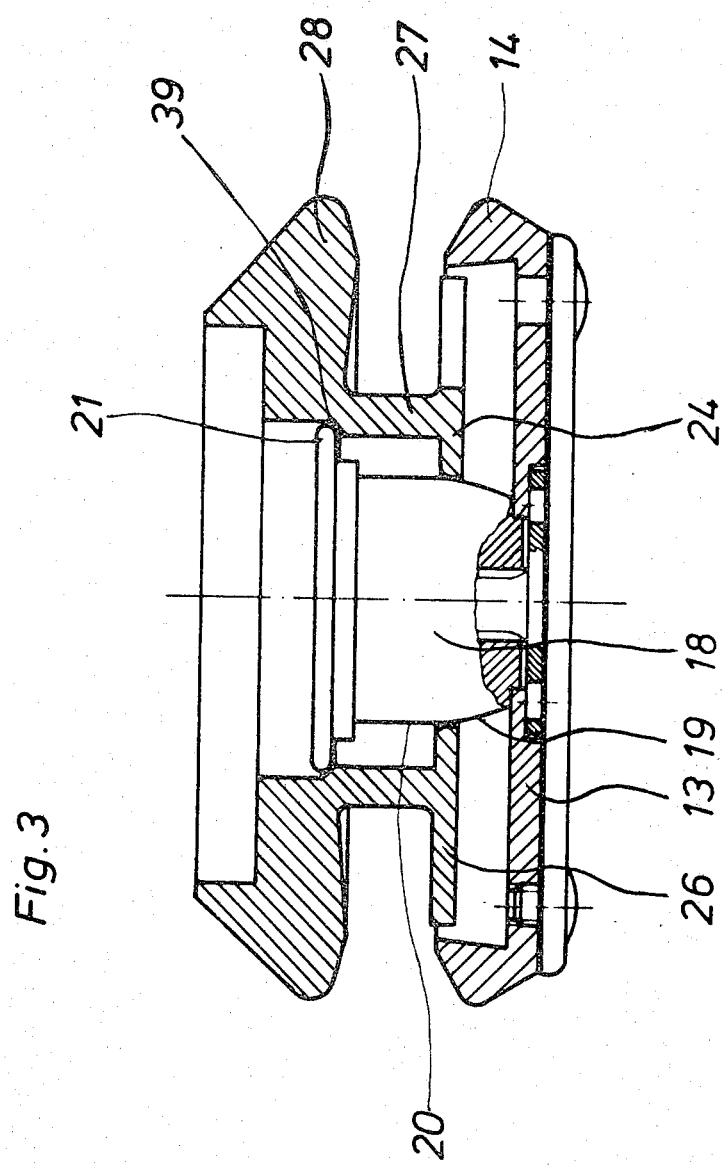

CENTRAL BELT LOCK, PARTICULARLY FOR AIRCRAFT SAFETY BELT

The present invention relates to a central belt or strap lock, particularly for aircraft safety belts, for simultaneous releasable connection of a plurality of belts or straps which have respective connection tongues with hook-shaped connection devices. The lock includes a lock housing having a hook-shaped bead, and a disc arranged across from the bead and shiftable against spring action upon a hub secured to the housing, with the disc being tiltable during at least one position of a latching device, which position permits the insertion of the connection tongues.

A central belt lock of this type is known from German Pat. No. 12 75 875, and is embodied in such a way that the movable holding disc is journalled so as to be capable of tilting or moving all over, i.e. can wobble, whereby the holding disc can tilt not only during fastening of the belt, but also during removal of the belt. Such a wobbling movement of the belt makes it possible during fastening of the belt that during insertion of a connection tongue the hook-shaped connecting device of the connection tongue can first be pushed over the hook-shaped bead, whereupon the connection tongue is secured by resilient tilting-back of the holding disc. During removal of the belt, the wobbling, or the free tilting capability, of the disc is, however, disadvantageous, because then possibly not all connection tongues are ejected simultaneously. Connection tongues, which are subjected to great stress, can generate a tilting of the holding disc in the direction of the tongues, so that the tongues are not capable of getting free from the hook-shaped bead, but rather remain suspended or caught thereon. This is particularly true for those connection tongues which are not located across from a secure connection tongue with which the lock housing is held on the belt structure.

It is therefore an object of the present invention to improve a central belt lock of the initially described type in such a way that the movable holding disc can tilt during engagement or fastening of the belt, but not during removal of the belt.

This object, and other objects and advantages of the present invention, will appear more clearly from the following specification in connection with the accompanying drawings, in which:

FIG. 2 shows the structure of FIG. 1 in the "fastened" or "engaged" position of functioning, whereby certain structural parts have been omitted to facilitate visualization of the features thereof; and FIG. 3 illustrates the structure of FIGS. 1 and 2 in the "removed" or "unfastened" position of functioning.

Figure 1:
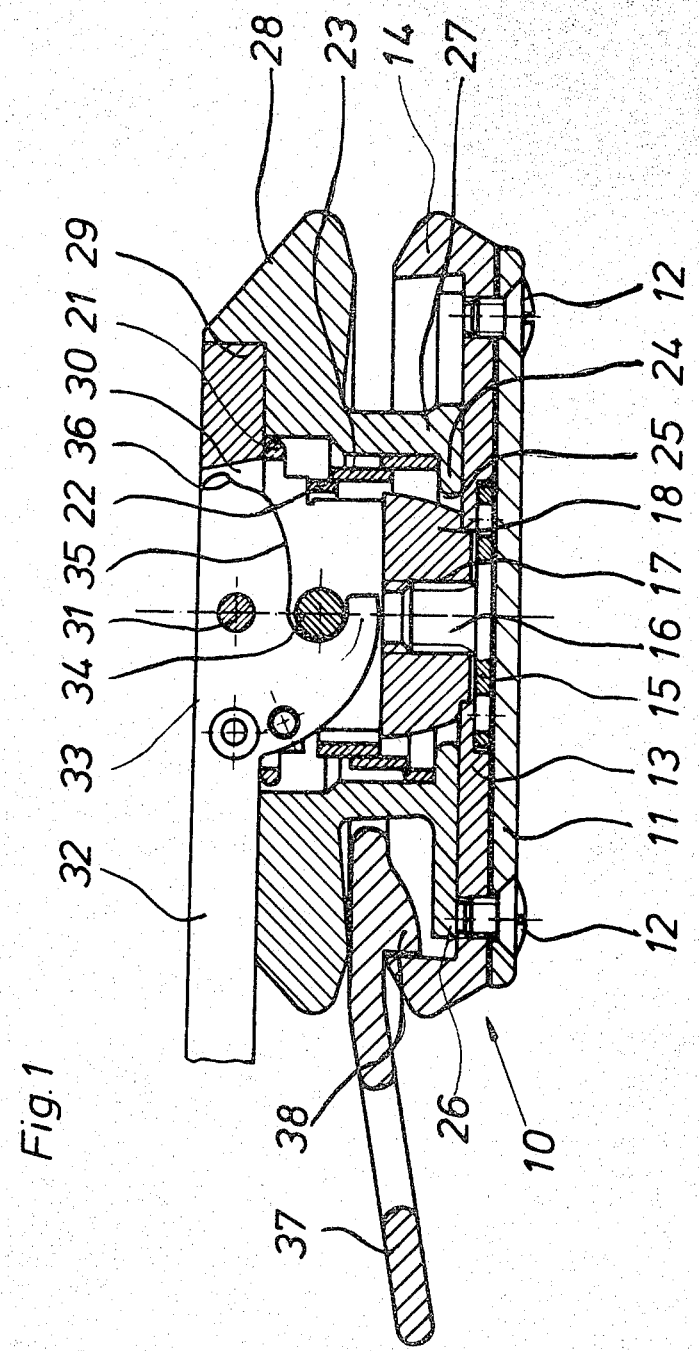
FIG. 1 is a diametrical cross section through an inventive central belt lock in the "secured" position of functioning.

The strap lock of the present invention is characterized primarily in that the hub has a tapering at that end thereof fastened to the housing, with the tapering extending essentially over the shifting path of the movable disc, and in that the opening of the movable disc, which encircles the hub, has a diameter corresponding essentially to the diameter of the cylindrical part of the hub.

According to further advantageous embodiments and improvements of the present invention, the tapering of the hub may have a spherical contour or shape which merges into the cylindrical part of the hub without any interruptions or steps. The upper end of the hub may have a ring-shaped rim against which an abutment of the movable disc engages during a position of the latching device permitting removal of the straps.

The movable disc may have a tubular extension which surrounds the hub and extends in a direction toward the housing; internally the extension supports the aforementioned abutment, and at its lower end the extension has a radial flange, the inner diameter of which defines the opening which encircles the hub, and the outer edge of which extends to below the latched or engaged connection tongues of the straps.

With the present inventive central strap lock, the dimensions of the hub on the one hand, and of the opening of the holding disc encircling the hub on the other hand, are coordinated in such a way that the movable holding disc can tilt or wobble as long as the disc is located in the region of the tapering of the hub. Accordingly, the connection tongues of the belts or straps can be inserted or introduced sequentially between the housing and the movable holding disc, in which connection the movable disc tilts until the hook-shaped connection devices of the connection tongues engage or catch over the hook-shaped bead of the housing, and the movable holding disc, which is under spring effect, secures the inserted connection tongues. To remove the belts or straps, the movable disc is lifted a predetermined extent by the latching device, whereby the disc arrives at the cylindrical region of the hub, the diameter of which is adapted to the diameter of the associated opening of the holding disc in such a way that a slide-seat is realized. The conditions are particularly advantageous if the tapering of the hub has a crowned or spherical contour or shape which merges tangentially into the cylindrical part of the hub, because the holding disc is then guided smoothly into the position provided for removal of the belt. Additionally, or alternatively, the holding disc in this position can engage against a ring-shaped rim or a corresponding projection at the free end of the hub, whereby a further guidance results.

Referring now to the drawings in detail, with the central belt or strap lock 10, a cup-like housing 13, which is open in the middle, is secured by screws 12 on a circular disc-shaped base plate 11; the housing 13 has an external bead 14 which is hook-shaped in cross section, so that the housing 13 is open upwardly.

A hub 18 is screwed onto the housing 13, concentrical with the bead 14, by means of a threaded bolt 16 and the associated threaded bore 17. As shown in FIG. 3, the lower end of the hub 18 has a spherical tapering 19 which merges without an interruption into the cylindrical part 20 of the hub 18.

The cylindrical part 20 of the hub 18, at the top, has an annular projecting rim 21, and therebelow has an annular step 22 against which one end of a truncated cone spring 23 is braced. The other end of the truncated cone spring 23 is supported on the inner side of a radial flange 24 which with the position of functioning illustrated in FIG. 1 engages the inner side of the cup-like housing 13. The radial flange 24 encloses an opening 25 which encircles the hub 18. The diameter of the opening 25 essentially corresponds to the diameter of the cylindrical stud or pin portion 20, so that a sliding seat or fit is realized when the radial flange 24 is lifted in the region of the cylindrical part 20 (FIG. 3).

The outer edge 26 of the radial flange 24 extends to close to the inner edge of the hook-shaped bead 14 of the housing 13. Moreover, the radial flange 24 is located at the lower end of a tubular extension 27 of a ring-like holding disc 28 which is freely movable and extends as far as over the hook-shaped bead 14 and consequently covers from above the recess formed between the hook-shaped bead 14 and the tubular extension 27. The holding disc 28 is embodied integrally or in a unitary manner with its tubular extension 27 and the radial flange 24, so that the entire structural part is supported from below by the spring 23 on the step 22 of the central hub 18.

On the upper side of the movable disc 28 there is secured an insert 29 which has a slot 30 through which a pin 31 passes, which pin serves as a pivot bearing for an actuating lever 32 held thereon. This lever 32, on that side facing the hub 18, has a hook-shaped projection 33 with which, in the position of functioning illustrated in FIG. 1, the lever 32 engages or catches under a pin 34 on the cylindrical part 20 of the hub 18. The recess formed by the hook-shaped projection 33 merges by way of a contour or shape 35 into a dent or depression 36, which forms an abutment for the pin 34 when the actuating lever 32 has been pivoted into an approximately upright or vertical position.

The illustrated central belt lock functions as follows:

When the non-illustrated belt or strap structure is to be fastened, the actuating lever 32 is pivoted or swung upwardly by approximately 25° from the position illustrated in FIG. 1, so that the latching between the hook-like projection 33 and the pin 34 fastened on the hub 18 is disconnected. Thereupon, connection tongues 37, which are fastened at the ends of the individual belts or straps of the non-illustrated belt mechanism, and which have hook-shaped projections 38 at their front ends, can be inserted or introduced into the circular slot provided between the housing 13 and the movable disc 28. During such insertion, the movable disc 18 tilts, as illustrated in FIG. 2, into an inclined position, so that the slot expands locally and the respective hook-shaped projection 38 of the connection tongue 37 to be inserted can pass over the hook-shaped bead 14 of the housing 13. When the connection tongue 37 has reached the position illustrated in FIG. 1, its hook-like projection 38 catches or engages behind the hook-like bead 14, and the movable disc 28 snaps back into the position illustrated in FIG. 1 under the effect of the spring 23. The tilting of the movable disc 28 is possible because the opening 25 of the radial flange 24 is located in the region of the tapering 19 of the hub 18. When the connection tongues 37 of all of the belts or straps are placed in position in this manner, the actuating lever 32 is pivoted back into the position represented in FIG. 1, whereby the hook-like projection 33 thereof catches behind the pin 34 on the hub 18, and accordingly latches or locks the belt lock.

To remove or unfasten the belts, the actuating lever 32 is swung or pivoted upwardly by approximately 90° until the depression 36 engages the pin 34. During such pivoting, the contour 35 slides along on the pin 34, as a result of which the actuating lever 32, along with the structural parts connected thereto, i.e. the insert 29, the movable disc 28, the tubular extension 27, and the radial flange 24, are lifted from the housing 13 against the effect of the spring 23. The outer edge regions of the radial flange 24 under these circumstances engage under the projections 38 of the connection tongues 37 and lift the same over the hook-shaped bead 14. Simultaneously, the radial flange 24 is guided by the spherical tapering 19 as far as to the region of the cylindrical part 20 of the hub 18, thus precluding a possible tilt movement of the movable disc 28 until the edge of the opening 25 is finally guided in the sliding seat on the cylindrical part 20. The shifting movement of the movable disc 28 terminates when the pin 34 engages the depression 36. Additionally, or alternatively, the rim 21 of the hub 18 can serve as an abutment for a step 39 formed internally on the tubular extension 27. This position of functioning is illustrated in FIG. 3. The connection tongues 37 can now readily slide out of the recess formed between the disc 28 and the radial flange 24 or the housing 13.

The present invention is, of course, in no way restricted to the specific disclosure of the specification and drawings, but also encompasses any modifications within the scope of the appended claims.

What I claim is:

1. A central strap lock, particularly for aircraft safety belts, for simultaneous releasable connection of a plurality of straps which have respective connection tongues which in turn are provided with respective hook-shaped connection devices, said central strap lock comprising in combination:

a lock housing having a base portion and a hook-shaped bead therearound;

a hub secured to said housing, that end of said hub secured to said housing being provided with a tapering portion, the other end of said hub comprising a cylindrical part;

a disc arranged on said hub and having a portion thereof located across from said bead of said housing, said disc being shiftable against spring action, with said tapering of said hub essentially coinciding in length with the shifting path of said disc, said disc including an opening which encircles said hub, said opening having a diameter corresponding essentially to the diameter of said cylindrical part of said hub; and a latching device associated with said disc, said latching device including a hook-like projection that engages a portion of said hub when said latching device is moved to a horizontal position locking said tongues in place, and said latching device also being movable into at least one other position which permits insertion of said connection tongues between said disc and said housing, said disc being tiltable around said tapering of said hub during said at least one other insertion position of said latching device.

2. A central strap lock in combination according to claim 1, in which said tapering of said hub has a spherical contour which merges smoothly into said cylindrical part.

3. A central strap lock, particularly for aircraft safety belts, for simultaneous releasable conneciton of a plurality of straps which have respective connection tongues which in turn are provided with respective hook-shaped connection devices, said central strap lock comprising:

a lock housing having a base portion and a hook-shaped bead therearound;

a hub secured to said housing, that end of said hub secured to said housing being provided with a tapering portion, the other end of said hub comprising a cylindrical part;

a disc arranged on said hub and having a portion thereof located across from said bead of said housing, said disc being shiftable against spring action, with said tapering of said hub essentially coinciding in length with the shifting path of said disc, said disc including an opening which encircles said hub, said opening having a diameter corresponding essentially to the diameter of said cylindrical part of said hub; and a latching device associated with said disc, said latching device being movable into at least one position which permits insertion of said connection tongues between said disc and said housing, said disc being tiltable around said tapering of said hub during said at least one insertion position of said latching device, said tapering of said hub having a spherical contour which merges smoothly into said cylilndrical part, said latching device being movable into a position which permits removal of said connection tongues from between said disc and said housing, said disc including an internal abutment, and that end of said cylindrical part of said hub remote from said base portion of said housing being provided with a ring-shaped rim against which said abutment of said disc engages during said removal position of said latching device.

4. A central strap lock according to claim 3, in which said disc is provided with a tubular extension, one end of which is connected to said disc, the other end of which extends towards said base portion of said housing, said extension surrounding said hub and internally supporting said abutment, that end of said extension closest to said base portion of said housing being provided with a radial flange which extends substantially at right angles to said extension, the inner diameter of said radial flange defining said opening which encircles said hub, and the outer edge of said radial flange extending below inserted connection tongues.

* * * * *